March 10, 1970 — W. S. BISSELL — 3,499,814
INTERLAMINAR TANK SEALING
Filed June 12, 1967
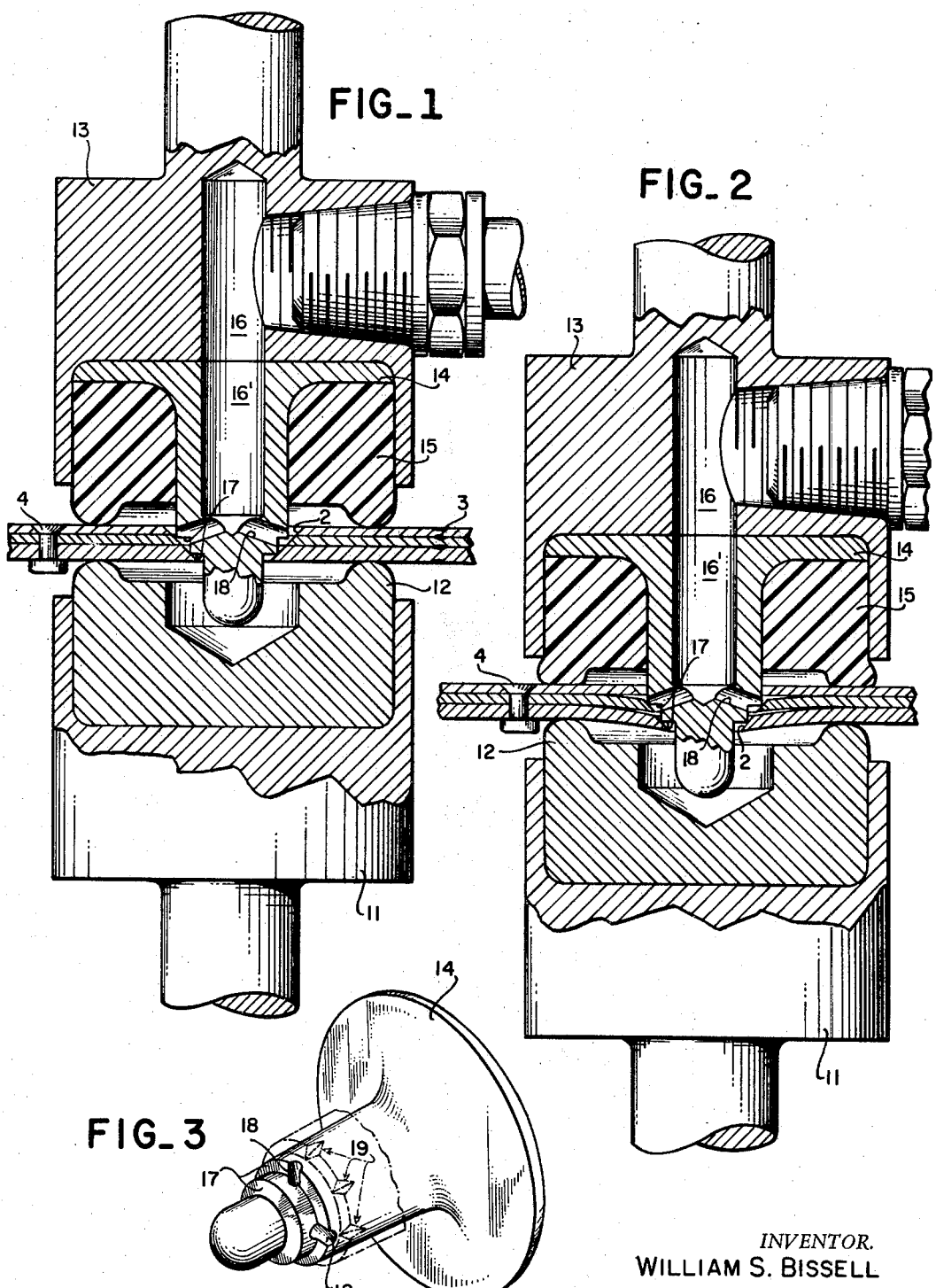
INVENTOR.
WILLIAM S. BISSELL
BY George C. Sullivan
Agent

United States Patent Office 3,499,814
Patented Mar. 10, 1970

3,499,814
INTERLAMINAR TANK SEALING
William S. Bissell, Granada Hills, Calif., assignor to Lockheed Aircraft Corporation, Burbank, Calif.
Filed June 12, 1967, Ser. No. 645,230
Int. Cl. G05g 15/00; B32b 31/00
U.S. Cl. 156—349    4 Claims

ABSTRACT OF THE DISCLOSURE

An apparatus for applying a sealant between multi-layer structures at countersunk holes wherein individual layers are deflected from each other and the sealant is introduced between the layers.

---

This invention relates to a method and apparatus for sealing laminated structures and more particularly for sealing laminates around countersunk holes.

The sealing of aircraft fuel tanks has presented problems for many years. Fuel storage in metal wing tanks has been particularly troublesome due to leakage as the wings became larger and more flexible. Various sealants and plastic tank liners have been utilized with some success. However, as aircraft are flown higher and faster the more hostile environment at supersonic speeds and high altitude is encountered. Changes in dimension caused by the temperatures encountered at supersonic speeds not only have necessitated structural changes to provide for controlled expansion but also have introduced leakage problems not solved by known methods.

It is therefore an object of this invention to provide sealing for laminated structures.

Another object of the invention is to provide a simple and inexpensive method of applying sealant to preassembled laminated panels or structures.

These and other objects will become more apparent from the following description when taken with the attached drawings wherein:

FIG. 1 is a side view partly in cross section of a preferred embodiment of the invention showing relationship of the respective parts before load application.

FIG. 2 is a side view partly in cross section showing the device of FIG. 1 after load application.

FIG. 3 is a perspective view of the probe of FIGS. 1 and 2.

Now with reference to FIG. 1, a laminated structure 1 is shown as consisting of three layers and having a countersunk hole 2 therein. The laminate shown may be a portion of a larger panel preassembled by spotwelds as at 3 or rivets 4.

An adaptor 11 holds an annular anvil 12 below and concentric with the countersunk hole 2. The anvil has a central opening for purposes to become apparent. Another adaptor 13 is similar to adaptor 11 except that it contains passages for the introduction of sealant. A probe 14, as illustrated in FIG. 3, and having an annular flange, is seated in the adaptor 13 and a rubber or plastic sealing member 15, having a central opening therein, is inserted into the adaptor 13 and around the probe 14. A central bore 16 is provided in the adaptor 13 and a radial opening intersecting the central bore is provided for attachment of a sealant line as illustrated. A mating central bore 16' is provided in the probe 14, and terminates adjacent the tip. A plurality of annular steps or shoulders 17 as best seen in FIG. 3 are formed on the end of the probe. A plurality of radial holes 18 intersect the central bore 16'.

To inject sealant between the layers, the laminated structure 1 is placed on the anvil 12 and load is applied to the adaptor. For example, the reduced portions of the adaptors may be sized to fit conventional rivet setting machines or the like. As the adaptor 13 moves toward adaptor 12, the probe projects into the anvil bore and deflects individual layers one after another, beginning with the bottom layer. When all layers are deflected, as illustrated in FIG. 2, sealant under pressure is applied to the bore 16 from a source, not shown.

Since the annular rim on the seal 15 is compressed against the laminate, sealant is forced into the spaces between the layers. When the load is removed the deflections return to the original position, or nearly so. When the panel is installed, say as an aircraft outer skin, by means of flat head screws, a sealed structure results, preventing leakage through the hole and between the layers.

It is believed apparent that probes for different numbers of layers of laminated structure may be readily provided by using probes having additional steps or shoulders, i.e., one step less than the number of layers. In this case, the added steps (as indicated in broken lines in FIG. 3) are provided with notches 19 to allow the sealant to flow past the step and between the added layers. Likewise probes for different size holes may be used. When different size probes are used, the seal 15 is likewise changed to accommodate different sizes.

While it is possible to apply sealant between layers of riveted laminates prior to assembly, this is not practical with spot welded assemblies due to the fact that metal to metal contact is necessary for welding. However, even as to riveted structures, it is preferable to utilize the method and means of this invention. For one thing, the sealant becomes hardened and loses the flow characteristics needed for sealing around subsequently drilled holes. Also, it is necessary to coat all contacting surfaces of the laminate even though the area of the holes to be drilled may be a small percent of the total area. It is therefore believed apparent that the present invention greatly simplifies the sealing of laminated structures as described herein.

What is claimed is:

1. Apparatus for sealing laminates around countersunk holes comprising anvil means for supporting the laminate, probe means for insertion into said hole, means on said probe means for separating the layers of the laminate when the probe is moved toward said anvil, passages in said probe for injecting sealant into the separated layers and seal means disposed around said hole for restricting the sealant to an area adjacent said hole.

2. An apparatus as defined in claim 1, wherein said separating means comprises a plurality of concentric annular steps.

3. An apparatus as defined in claim 2, said passages comprising an axial bore extending substantially coextensively through said probe and terminating adjacent said steps, and a plurality of radial holes extending from said steps into said radial bore.

4. An apparatus as defined in claim 1, wherein the seal means is an annular member surrounding said probe and having an annular rim spaced from said probe and adapted to contact the upper surface of said laminate.

References Cited

UNITED STATES PATENTS

| | | | |
|---|---|---|---|
| 1,926,415 | 9/1935 | Wertz | 118—410 |
| 3,173,170 | 3/1965 | Reusch | 118—410 |
| 3,434,908 | 3/1969 | MacDonald | 156—514 |

FOREIGN PATENTS 578,563  6/1959  Canada.

SAMUEL FEINBERG, Primary Examiner

U.S. Cl. X.R.
118—410; 156—514